UNITED STATES PATENT OFFICE.

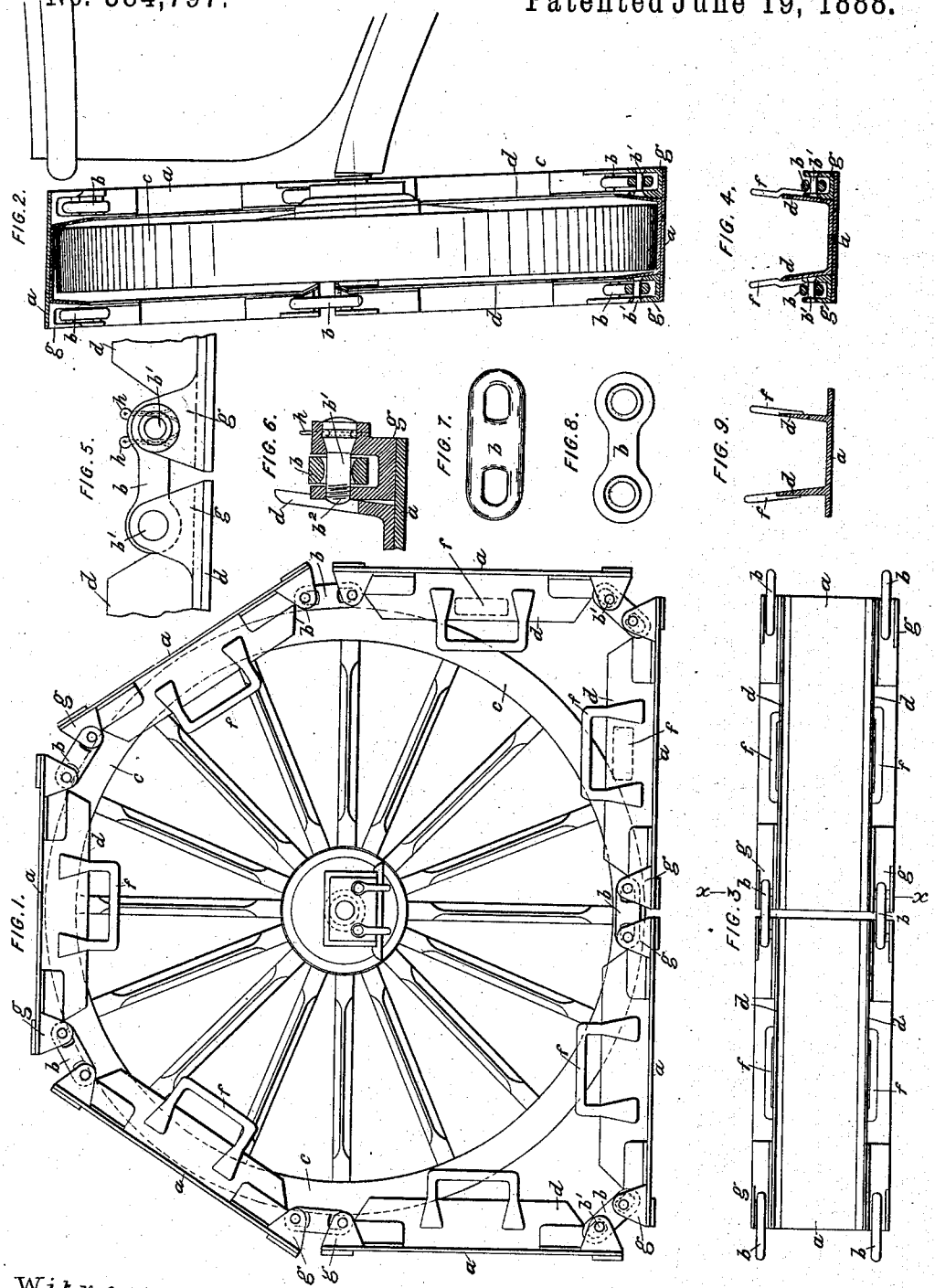

HENRY GARTSIDE TIPPING, OF KINGSTOWN, COUNTY OF DUBLIN, IRELAND.

ENDLESS PLATEWAY FOR WHEELED VEHICLES.

SPECIFICATION forming part of Letters Patent No. 384,797, dated June 19, 1888.

Application filed March 27, 1888. Serial No. 268,612. (No model.) Patented in England December 20, 1886, No. 16,699.

*To all whom it may concern:*

Be it known that I, HENRY GARTSIDE TIPPING, a subject of the Queen of Great Britain, resident at Kingstown, in the county of Dublin, Ireland, lieutenant royal navy, have invented new and useful Improvements in Endless Plateways for Wheeled Vehicles, Instruments, and Machines, (for which I have obtained a patent in Great Britain, No. 16,699, dated December 20, 1886,) of which the following is a specification.

My invention has reference to what are known as "self-laying" plateways of the endless form, which are proposed for use more particularly to wheeled vehicles, instruments, and machines which have to travel or are drawn or propelled over soft surfaces—such as soft roads, sands, shingle, fields, and such like places.

Examples of vehicles, instruments, and machines to which my invention is particularly applicable are life-boat carriages, artillery-carriages, traction-engines, and wheeled agricultural carts and machinery, and the like.

An endless self-laying plateway with improvements applied according to my invention is constructed as follows: It is made in the form of an endless articulated way or track having suitable joints, which takes over the periphery of each of the wheels of the object to which it is applied. The width of the plateway is considerably in excess of that of the periphery of the wheel. To the interior surface of the plates which form the bearing-surfaces of the way there are provided projecting guides or cheeks, which serve to fit over the wheel and keep the wheel in position in the way, the whole plateway being so constructed that all the guides always lap over the wheel tire or periphery, and so prevent any of the plates from falling off, this being effected without the necessity of radial rods from the axis of the wheel or other equivalent means. These cheeks or projecting guides are preferably flared outward between the joints. The spaces between the joints of the plates are preferably made as small as possible—say from one-fourth to one-half inch.

The combined length of the plates forming the endless way is greater than that of the circumference of the wheel, and is such as will permit of one or two of the plates to bear upon the surface of the ground, according to the position of the plates.

In order that my invention may be clearly understood, I have hereunto annexed a sheet of drawings, which illustrate the application of an endless plateway according to my invention as applied to a life-boat-carriage wheel.

The drawings make a part of this specification, and are marked with figures and letters of reference corresponding with those used in the following explanation, and like letters of reference are used to denote like parts throughout the several views.

In the drawings, Figure 1 is a side elevation of an endless plateway according to my invention as applied to the wheels of a life-boat carriage. Fig. 2 is a sectional end elevation of the plateway and wheel shown in Fig. 1. Fig. 3 is a plan of a portion of the plateway. Fig. 4 is an end section of the plateway through $x\ x$, Fig. 3. Figs. 5 and 6 show in elevation and cross-section, respectively, a modified form of link and plate coupling connection. Fig. 7 shows in detail the link illustrated in Fig. 1, and Fig. 8 shows in detail the modified form of link illustrated in Figs. 5 and 6. Fig. 9 shows in cross section a modified construction of plate of the plateway.

In the drawings I have only shown one wheel with its plateway; but it will be understood that a similar plateway is applied to the other large wheel, and, if desired, to all the wheels of the carriage.

The endless plateway is constructed as follows: It consists of a series of plates, *a*, which are connected by hinge-links *b*, so as to form an endless articulated way or track, which takes over the periphery of the wheel *c*. The plates *a* are considerably wider than the wheel *c* at its periphery, and the interior surfaces of the plates *a*, which form the bearing-surfaces of the way, are provided with projecting flanges or guides *d*, which fit over the periphery of the wheel *c* and keep the wheel *c* in position in the way formed by the guides *d*. The guides *d* are preferably flared outward, as shown at Figs. 4 and 9. The plates *a* are joined by hinge-links *b*, as stated, which have "play" in them, as shown by the drawings. *b'* are the hinge-pins, and *g* the pin-sockets. The combined length of the plates *a*, forming the endless way, is greater than that of the circumference of the wheel $c$, and is such as will permit of one or two of the plates $a$ always bearing upon the surface of the ground, according to the position of the plates, as the wheel $c$ revolves. For example, in the position shown at Fig. 1 there are two plates bearing on the ground. In the next position, as the wheel revolves and is midway on the next plate, there will be one plate on the ground and then two, and so on, the back plate lifting as the front plate is laid and the plateway being self-laying as the wheels revolve.

The guides $d$, with reference to Figs. 1 to 4, are made of channel-iron and secured to the plates $a$ by riveting; but these guides, if desired, may consist of two angle-irons riveted to the plate $a$, or they may be formed on or welded to the plates, as shown in Fig. 9. The plates $a$ may be corrugated, if desired.

The links shown in Figs. 1, 2, 3, 4, and 7 are in the form of chain-links, and thereby give the plates a considerable amount of play; but the links shown in Figs. 5, 6, and 8 are in the form of solid links provided with eyes having concave inner surfaces, through which the pins $b'$ pass. This construction provides for considerable oscillatory play, but little longitudinal play.

In most cases I prefer to provide handles $f$ on the plateway; or hand-apertures $f$, as shown in dotted lines in Fig. 1, may be provided instead. These facilitate the carrying of the plates and their application to the wheels.

Special pins $b'$ (see Figs. 5 and 6) are provided at certain hinges. These pins are screwed at one end, $b^2$, and screw into the socket $g$. At the other end of the socket they are held by split pins $h$, which pass through holes in the sockets $g$ and lie in a groove formed in the head of the pin $b'$, as shown. This construction of pin and pin attachment affords a means by which the plates can be readily disconnected or linked up—namely, by taking out the split pins $h$ and unscrewing the pin $b'$ it is withdrawn, and by repeating this operation on the fellow pin $b'$ the plateway can be disconnected and removed from its wheel; and of course by the converse operation the plates can be coupled up.

It will be observed upon reference to Fig. 1 that seven plates $a$ are provided and constitute the plateway, and that the side guide, $d$, of every plate fits over or laps over the edges of the tire or periphery of the wheel, and consequently whatever position the plates may be in one portion of each of the guides will overlap the tire, and will so prevent any of the guides and plates from getting out of place or coming off. The wheel shown is about five feet in diameter and the plates are seven in number. This number I have found is suitable for this size of wheel and for life-boat carriages; but I do not confine myself to any particular number or size of plates, as these will of necessity vary with varying sizes of wheels to which they are to be applied and to different conditions of their application; but in all cases the length of plates and depth of guides must be such as will allow the said guides to lap over the tire or periphery of the wheel, as set forth.

Having now particularly described and ascertained the nature of my said invention and in what manner the same is to be performed, I declare that what I claim is—

1. An endless trackway for wheeled vehicles, consisting of a series of plates, $a$, each having side guides, $d\ d$, extending nearly the entire length of the plate and adapted to fit over the edges of the wheel, each plate provided at its ends on both sides with socket-pieces $g\ g$, located outside said guides, a series of links, $b$, and hinge-pins $b'$, connecting the links and socket pieces, substantially as shown and described.

2. An endless trackway for wheeled vehicles, consisting of a series of plates, $a$, having outwardly-flaring guide-flanges $d\ d$, and pin-sockets $g\ g$, located outside said flanges, a series of links, $b$, and hinge pins $b'$, substantially as shown and described.

3. In self-laying plateways consisting of a series of plates hinged or connected together, as described, the combination of the handles or apertures $f$, substantially as and for the purposes set forth.

HENRY GARTSIDE TIPPING.

Witnesses:
   FREDERICK JOHN CHEESBROUGH,
   JAMES ANDREW COUBROUGH,
*Both of* 15 *Water Street, Liverpool, England.*